United States Patent [19]

Kent et al.

[11] Patent Number: 4,546,415

[45] Date of Patent: Oct. 8, 1985

[54] HEAT DISSIPATION ALUMINUM ELECTROLYTIC CAPACITOR

[75] Inventors: Thomas A. Kent, Irmo; Jesse S. Shaffer, Columbia, both of S.C.

[73] Assignee: North American Philips Corporation, New York, N.Y.

[21] Appl. No.: 593,226

[22] Filed: Mar. 27, 1984

Related U.S. Application Data

[63] Continuation-in-part of Ser. No. 329,367, Dec. 10, 1981.

[51] Int. Cl.⁴ .............................................. H01G 9/00
[52] U.S. Cl. ...................................... 361/433; 29/570
[58] Field of Search ........................... 361/433; 29/570

[56] References Cited

U.S. PATENT DOCUMENTS

| | | | |
|---|---|---|---|
| 2,018,500 | 10/1935 | McDermott | 361/433 |
| 3,681,666 | 8/1972 | Bowling | 361/433 |
| 4,264,943 | 4/1981 | Anderson et al. | 361/433 |

Primary Examiner—L. T. Hix
Assistant Examiner—Douglas S. Lee
Attorney, Agent, or Firm—Norman N. Spain

[57] ABSTRACT

An aluminum electrolytic capacitor having improved axial heat dissipation resulting from a smaller ratio between the width of the anode foil and the diameter of the capacitor foil roll.

1 Claim, 3 Drawing Figures

HEAT DISSIPATION ALUMINUM ELECTROLYTIC CAPACITOR

CROSS REFERENCE TO RELATED APPLICATION

This application is a continuation-in-part of application Ser. No. 329,367, filed Dec. 10, 1981 of the same title.

BACKGROUND OF THE INVENTION

1. Field of the Invention

This invention pertains generally to the field of aluminum elcetrolytic capacitors and specifically to the construction of such a capacitor designed to increase the rate of heat flow from the core of the capacitor, thereby increasing the wattage handling capability of the device.

2. Description of the Prior Art

The internal heat generated during fluctuating voltage operation of an aluminum electrolytic capacitor can cause the core of a capacitor to become a relatively hot spot in operation. This necessitates a design for the construction of an aluminum electrolytic capacitor operated at relatively high currents which will conduct heat from the core of the capacitor to the outside environment.

The traditional thermal model of an aluminum electrolytic capacitor is characterized by radial heat flow, the design serving to conduct heat from the core to the side of the can in which the capacitor is encased. For the thermal radial model of such a capacitor, the optimum shape would be a relatively tall unit of small diameter.

The problem to which the present invention addresses itself is well known in the prior art. One of the most successful, commercially available electrolytic capacitors designed for improved heat dissipation is the type 101R capacitor of Sangamo which is provided in an advertised thermal pack construction. The Sangamo type 101R is constructed from a standard aluminum electrolytic capacitor foil roll in which the anode foil and the cathode foil, interleaved with a spacer, are wound on an arbor in a conventional fashion. The cathode foil is extended at the base end of the roll significantly below the anode foil. The aluminum can in which the foil roll is placed is further configured to improve heat dissipation. The base of the can is reinforced with a plurality of ribs having an upwardly projecting conical structure at its center to engage the base of the core of the foil roll. The extended cathode contacts these ribs at less than 20% of the total surface area. The nonconductive cover of the can has a correspondingly situated plurality of ribs and downwardly projecting conical structure to engage the opposite end of the core of the foil roll. The foil roll is in a relatively stable position in the can and the use of a potting compound is eliminated. This further improves the reliable operation of the safety vent as well, since it permits a relatively unobstructed flow of gasses when certain conditions of temperature and stress are encountered, lowering the rate of internal pressure rise. The Sangamo type 101R relies primarily upon the conventional or traditional thermal model and is a device characterized by radial heat flow assisted by an axial flow. Its optimum shape is a tall unit of small diameter.

While the Sangamo type 101R device is an effective prior art answer to the question of heat dissipation, the device of the present invention yields improved performance while at the same time reducing the cost of construction.

SUMMARY OF THE INVENTION

This invention pertains to an aluminum electrolytic capacitor having improved heat dissipation. The purpose of this invention is to increase the rate of heat flow out of the core of an aluminum electrolytic capacitor and thereby increase the wattage handling capability of the device. The invention accomplishes this purpose by incorporating several significant modifications to the standard assembly of a computer grade aluminum electrolytic capacitor. The design of the capacitor of the present invention changes the traditional thermal model of an aluminum electrolytic capacitor from a device characterized by a radial heat flow to one characterized by an axial heat flow. For the radial thermal model, the optimum shape would be a tall unit of small diameter. For the axial thermal model, the optimum shape is a short unit of a larger diameter. In a conventional thermal model, the ratio between the height of the anode foil and the diameter of the foil roll would be in the vicinity of 8 to 5. For an axial thermal model, this ratio optimally would be in the order of 1 to 3, thereby creating a very flattened model. This change in the ratio between the height of the anode foil and the diameter of the capacitor foil roll is the most significant change in the standard design of a capacitor. This design change can be combined with several other modifications to improve the axial thermal flow. In the capacitor of the present invention, the cathode foil is extended from the bottom of the capacitor roll to reach below the base of the anode foil down to the bottom of the can. The cathode foil is not swaged. The capacitor unit is assembled so as to press the full area of the extended cathode foil against the bottom of the can. The bottom of the can may be strengthened to prevent bulging due to internal gas pressure. Optionally, the foil roll may be wound on a larger than normal arbor to increase the diameter of the core void and reduce the core hot spot temperature. This also increases the surface area of the core and facilitates the rilling of the foil roll in a can. The unit is assembled so as to press the cathode foil against the circumferential side of the can so that the can may be rilled, securing the foil roll in place within the can. A heavy gauge cathode foil may also be used to increase the heat flow rate.

In view of the fact that a wide range of capacitors having improved heat dissipation is desirable, it is important to note that the ratio of the cathode mass to the foil roll mass is directly proportional to the rate of heat flow out of the unit. This invention utilizes the fact that aluminum has many times the thermal conductivity of the liquid electrolytes. Thus, a variety of shapes and types and sizes of capacitors could be made while adhering to the principle of the present invention. The can bottom may be thickened, ribbed or domed to prevent movement and loss of contact with the cathode foil as a result of internal gas pressure. Doming of the bottom of the can is a preferred embodiment because the doming may be done after assembly of the capacitor and lowers its ultimate construction cost. Compressible pads or a ribbed extension on the cover of the device may be used to press the foil roll in the can, thereby pressing the cathode against the can bottom to hold the roll in position until the can is reeled. The construction of the aluminum electrolytic capacitor of this invention increases heat flow out of an operational unit, thereby extending its useful life. It has a further advantage in providing a lighter weight unit having an increased void volume for gas expansion. It further includes the capability of incorporating an internal heat sink in the bottom of the can for greater thermal dissipation. External heat sinks become much more effective with the improved heat dissipation characteristics following the analogy of resistors in series. In the prior art the main resistance to heat flow was from the roll to the case. Little improvement in heat dissipation was realized by using an external heat sink. The present invention allows more heat flow from the foil roll to case thereby making more effective use of external heat sinks.

DESCRIPTION OF THE PREFERRED EMBODIMENT

Figure 1:
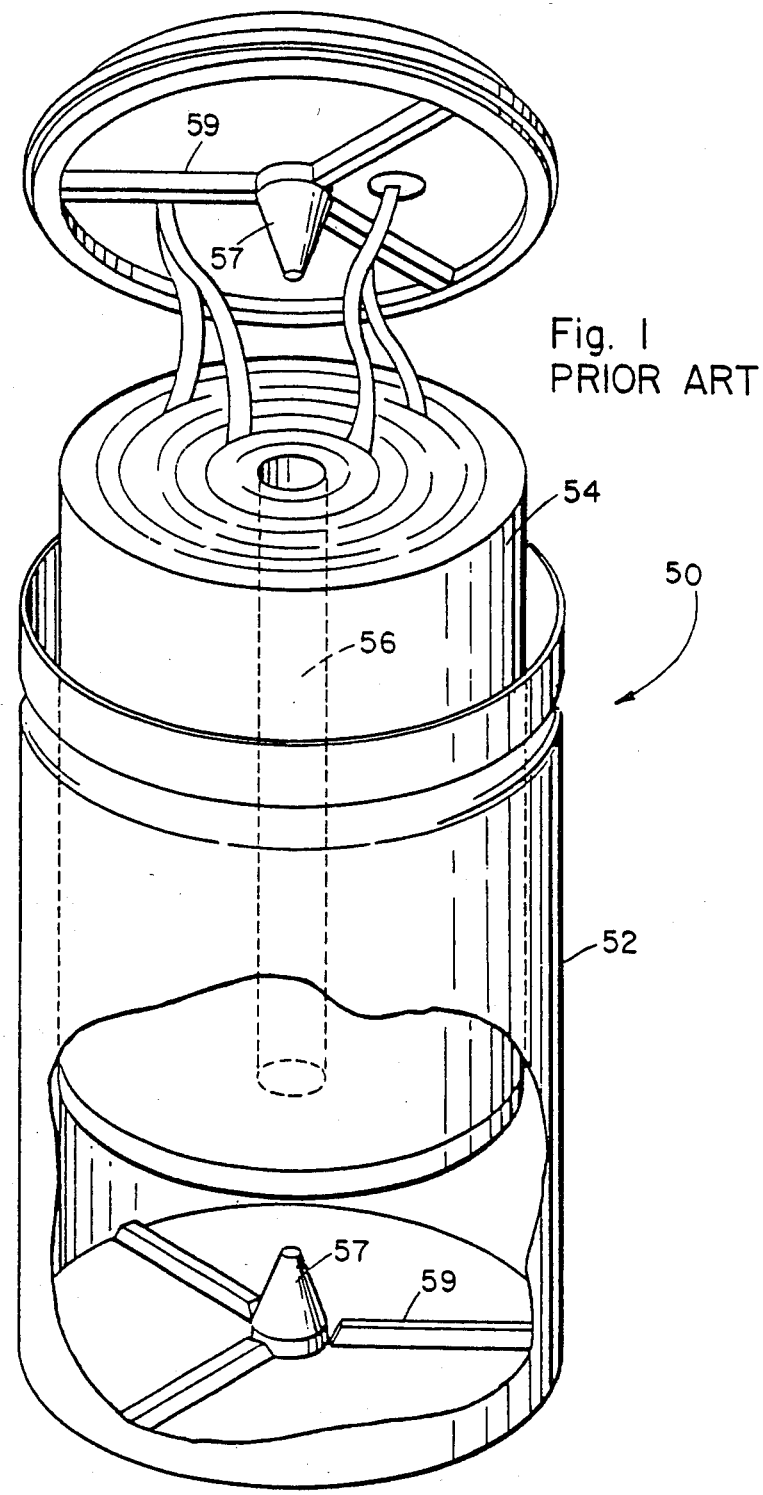
FIG. 1 is an exploded perspective view of a prior art aluminum electrolytic capacitor having improved dissipation.

Referring now to the drawings, FIG. 1 illustrates a prior art aluminum electrolytic capacitor 50 having construction features designed to improve heat dissipation. The capacitor 50 illustrated is the type 101R manufactured by Sangamo, advertised as having a thermal pack construction, which construction illustrates one attempt to improve the heat flow from the core of an aluminum electrolytic capacitor. While the device shows some attempt to direct the heat flow axially, the shape of the overall capacitor is that of one characterized by a radial heat flow, being a relatively tall unit of small diameter. As advertised, the unit provides an improved heat transfer because of a continuous heat conduction path from its core area 56 to the case or housing 52. This improved heat transfer is accomplished because a capacitor roll is force fitted against the external cylindrical wall of the can 52. Other features which contribute to the improved heat dissipation are the extension of the cathode foil below the level of the paper spacer and anode foil. FIG. 1 also illustrates one method of securing the capacitor roll in position, while eliminating the potting compound. Prongs 55, 57 extend inward into the core, securing the core in a central position within the can 52, while the foil roll rests on radial bars 53, 59, thereby providing space between the top 60 and the base of the can 52 and the foil roll 54.

Figure 2:
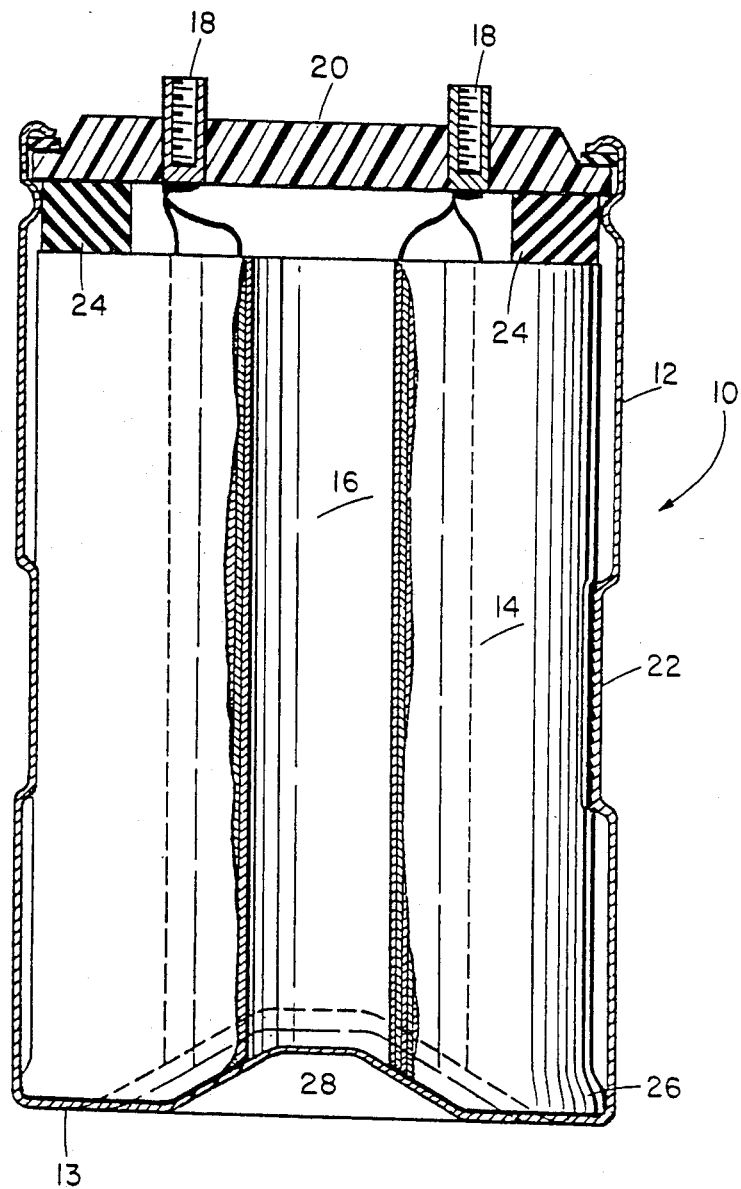
FIG. 2 is a cross-sectional view of a prior art aluminum electrolytic capacitor.

FIG. 2 illustrates in vertical cross section a typical capacitor construction. Capacitor 10 includes an aluminum can or housing 12 of a generally cylindrical shape and having a base 13 and an open top. A capacitor roll 14 having interleaved an anode foil, a paper spacer, and a cathode foil wound about an arbor leaving a generally void core area 16 is inserted within the can 12. An insulating molded cover 20 having terminals 18 is secured by crimping on the top of the can 12. Prior to securing the cover, the capacitor 10 is filled with a liquid electrolyte.

The capacitor 10 illustrates the traditional thermal model of an aluminum electrolytic capacitor in that the heat flow is a radial heat flow, and the ratio of the height of the anode foil to the diameter of the capacitor foil row is approximately an 8 to 5 or greater ratio.

Figure 3:
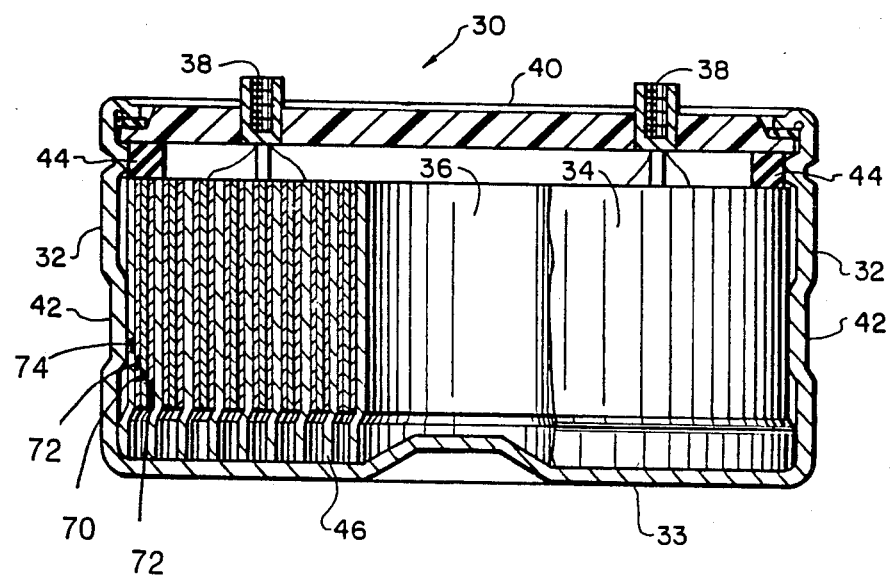
FIG. 3 is a cross-sectional view of an aluminum electrolytic capacitor having the improved heat dissipation design of the present invention.

FIG. 3 illustrates a vertical cross sectional view of the improved capacitor construction of the present invention. Since this invention relates to improved features of the standard aluminum electrolytic capacitor, those features known in the prior art will not be described in detail. Capacitor 30 includes an aluminum can or housing 32 of a generally cylindrical shape and having a base 33 and an open top. A foil capacitor roll 34 having interleaved an anode foil 70, a spacer 72 usually of paper, and a cathode foil 74 is inserted within can 32. The said roll 34 may be wound about a large diameter arbor leaving a generally void core area 36. Area 16 is only necessary if a dome or other similar method is used to secure the bottom of the roll. An insulating molded cover 40 is secured by crimping on the top of the can. Prior to securing the cover, the capacitor 30 is filled with a liquid electrolyte.

The capacitor 30 of the present invention differs from the traditional thermal model of an aluminum electrolytic capacitor in that it reorients the heat flow from a radial heat flow as exemplified by the prior art capacitor 10, FIG. 2, to an axial heat flow. For the axial thermal gradient, the optimum shape would be a short unit of relatively larger diameter. As illustrated in FIG. 3, the ratio of the height of the anode foil 70 to the diameter of the capacitor foil roll 34 in the present invention is optimally 1 to 3 thereby creating very flattened model. To insure that the maximum heat flow within the capacitor is always longitudinal, a ratio of 1 to 3 is chosen. This ratio can range from 1 to 2 to 1 to 10. This change in the ratio between the height of the anode foil and the diameter of the capacitor foil roll is the most significant change in the standard design of a capacitor. In view of the fact that a wide range of capacitors having improved heat dissipation is desirable, it is important to note that the ratio of the cathode mass to the foil roll mass is directly proportional to the rate of heat flow out of the unit. This invention utilizes the fact that aluminum has many times the thermal conductivity of the liquid electrolytes. Thus, a variety of shapes and types and sizes of capacitors could be made while adhering to the principle of the present invention.

As in the prior art, the larger diameter capacitor roll 34 is snuggly fitted within the can 32. The capacitor roll 34 in the present invention is secured in position within the can by a circumferential rill 42 in the can wall to maintain the roll in position and also to aid in a radial heat transfer. While the design of the present invention is directed to an axial heat transfer, the radial heat transfer is also utilized. Additionally, compression pads 44 are used to secure the roll 34 in position, these compression pads 44 being located between the top of the capacitor roll 34 and the insulating cover 40. As in all capacitors, the spacer extends slightly above the upper edges of the anode 70 and cathode 77 foils. Similar to the prior art, the cathode foil 74 is wider than the anode foil 70 so that when the foil layers are wound, the cathode foil extends below the level of the anode foil and spacer. In the design of the present invention, this additional extension 46 of the cathode layer is increased. In contrast with the prior art, however, the extended cathode layer 46 is not swaged, but the unit is assembled so as to press the extended cathode foil 46 against the bottom 33 of the can 32 to improve heat dissipation through the bottom 33 of the can 32. This in turn improves the axial heat flow.

Hence, to summarize the invention as disclosed, the purpose of the invention is to increase the axial rate of heat flow out of the core of an aluminum electrolytic capacitor and thereby increase the wattage handling capability of the device. The primary means to accomplish this purpose is to change the ratio of the height of the anode foil to the diameter of the foil roll so that the resulting ratio will be 1 to 3 rather than 8 to 5. The capacitor of the present invention has been tested to verify the desired results. The purpose of the test was to investigate the thermal properties of the capacitor of the present invention which has a relatively flattened shaped compared to the traditional capacitor. Five capacitors 30 using a full can design for a 3 inch diameter roll, a 1 inch anode foil width and an additional ¼ inch cathode excess at the bottom of the roll were constructed. Wedges or spacers to press the cover against the roll, thereby pressing the roll against the bottom of the can were utilized. A relatively thick cathode foil was used. Five standard capacitor designs of the same rating were also assembled for test. Thermal couples were installed in these units. The units were tested in an air chamber for dissipation power and air flow. The test voltage was 375 volts and a side by side comparison was made. The results of the test were as follows. A control unit, #13, failed when the temperature reached 141° C. After an initial build-up, the experimental unit, #39, maintained at least 50% lower core temperature rise. From the test results, applicant has concluded that the short design with a positive cathode contact to the case is able to conduct more thermal energy out of the unit than the standard design. Some typical test results are shown in the table that follows. These results are shown for units Nos. 13 and 39 of the test.

| Time | Current (Amps) | Watts | Air Flow (CFM) | Temperature °C. Ambient | #13 | #39 |
|---|---|---|---|---|---|---|
| 11:44 | — | ACV | — | 25.5 | 25.5 | 25.3 |
| 11:50 | 10.13 | | ½ | 26.3 | 33.4 | 32.0 |
| 11:56 | 10.14 | | ½ | 26.5 | 40.4 | 36.3 |
| 12:11 | 10.3 | | ½ | 22.3 | 53.4 | 42.8 |
| 12:26 | 10.3 | | ½ | 25.9 | 60.1 | 44.6 |
| 12:34 | 10.3 | 25.1 | 258 | ½ | 26.5 | 62.7 | 45.6 |
| 12:48 | 10.3 | 25.2 | 260 | ½ | 26.7 | 65.0 | 45.9 |
| 13:03 | | | | | 23.0 | 67.0 | 45.7 |
| 13:19 | | | | | 26.6 | 67.7 | 46.0 |
| 13:24 | 10.20 | 24.8 | 253 | ½ | 26.4 | 68.1 | 46.3 |
| 14:20 | 13.3 | | | | 23.1 | 70.4 | 47.7 |
| 14:56 | 13.7 | | | | 26.4 | 90.0 | 58.4 |
| 15:26 | 13.3 | | | | 26.4 | 92.4 | 57.8 |
| 16:00 | 13.0 | | | | 25.9 | 91.0 | 55.8 |
| 17:00 | | | | | 26.5 | 90.9 | 56.6 |
| 18:02 | | | | | 22.8 | 91.2 | 56.7 |
| 19:03 | | | | | 25.5 | 91.4 | 55.9 |
| 20:04 | | | | | 26.1 | 92.0 | 56.3 |
| 21:06 | | | | | 25.6 | 98.5 | 58.2 |
| 22:07 | | | | | *26.0 | 141.2 | 61.3 |

*Assume control unit failure at this point

The preferred embodiment includes an optional feature which further improves the thermal performance of the capacitor 30. The bottom 33 of the can 32 may be thickened, ribbed or domed to prevent movement of the foil roll 34 and loss of contact with the cathode foil 74 as a result of internal gas pressure. Doming the bottom 33 of the can 32 may be done after the assembly of the capacitor 10 and appears to be the most effective and least expensive optional feature to improve axial heat dissipation. As illustrated in FIG. 3, the variable depth and diameter of the dome 38 in the bottom 33 of the can 32 is permissible within the scope of the invention. The variability is directly proportional to the variability in the wound area of the capacitor roll 34 that is the area between the inside edge of the foil roll 34 adjacent to the core and the outside circumferential edge adjacent the wall of the can 32.

External heat sinks become much more effective with the improved heat dissipation characteristics following the analogy of resistors in series. In the prior art the main resistance to heat flow was from the roll to the case. Little improvement in heat dissipation was realized by using an external heat sink. The present invention allows more heat flow from the roll to case thereby making more effective use of external heat sinks.

Other variations may also be possible within the scope of the invention. The ratio of the cathode mass to the foil roll mass is directly proportional to the rate of heat flow out of the capacitor 30. To insure that the maximum heat flow within the capacitor is always longitudinal, a ratio of 1 to 3 is chosen. This ratio can range from 1 to 2 to 1 to 10. Consequently, these factors may be varied to fit user requirements in terms of physical size and electrical specifications of any particular production model capacitor built according to the principles of this invention. Also, any means to secure the capacitor roll in position and to maintain the pressure contact of the cathode foil to the bottom 33 for the life of the capacitor may be utilized.

The preferred embodiment of the capacitor 30 is described serves to increase heat flow out of an operational aluminum electrolytic capacitor, thereby extending the useful life of the unit. The capacitor of the present invention accomplishes this by increasing the heat flow primarily in an axial direction without negating radial heat flow. It also provides a device that is comparatively lighter in weight for the heat flow due to removal of potting material. It also increases the void volume for gas expansion. And furthermore, it has the capability of incorporating an external heat sink to the bottom of the can for greater thermal dissipation.

I claim:

1. An electrolytic capacitor having a capacitor foil roll of interleaved anode foil, spacer and cathode foil which capacitor roll is snuggly accommodated in a housing enclosed by means of a cover, said anode foil and said cathode foil being electrically connected to the corresponding terminals in said cover, characterized in that:
   said capacitor foil roll has a ratio of anode foil width to foil roll diameter of 1 to 2 or greater;
   the cathode foil layer of said capacitor foil roll extending below said anode foil and said spacer, the lower edges of said cathode foil engaging and being force fitted against the base of said housing for the conduction of heat from said foil to the base of said housing;
   a circumferential compressible pad positioned between the cover of said housing and the top of said foil roll to maintain downward pressure on said foil roll; and
   the diameter of said foil roll being increased and the height of said foil roll being decreased within said ratio to provide optimal axial heat dissipation for a given capacitance and power level.

* * * * *